Dec. 17, 1968   P. FYKES   3,416,854
REMOTELY ADJUSTABLE REAR VIEW MIRROR WITH PNEUMATIC OPERATOR
Filed Jan. 19, 1966
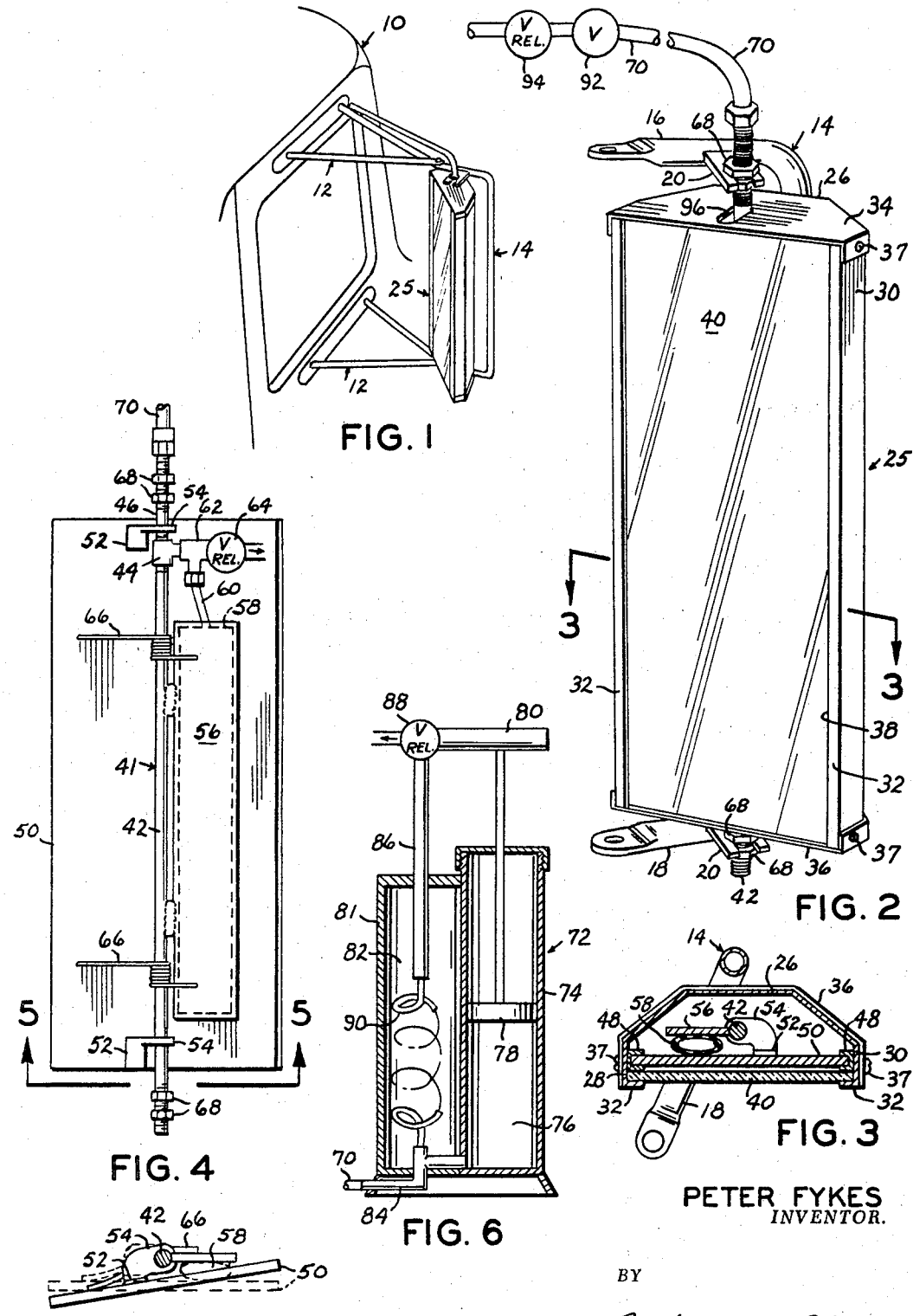
PETER FYKES
*INVENTOR.*
BY
*Robert K. Rhea*
AGENT

3,416,854
REMOTELY ADJUSTABLE REAR VIEW MIRROR WITH PNEUMATIC OPERATOR
Peter Fykes, 100 SW. 6, Moore, Okla. 73060
Filed Jan. 19, 1966, Ser. No. 521,564
4 Claims. (Cl. 350—289)

The present invention relates to rear view mirrors and more particularly to an adjustable rear view mirror for trucks, or the like.

In the operation of vehicles, particularly trailer equipped vehicles having a wide load, such as large vans, it is customary to provide mirrors mounted on brackets at either side of the truck cab. These mirrors, particularly the righthand mirror, in order to view the road way rearwardly of the truck or trailer, are mounted at a considerable distance from the vehicle body thus making it impractical for the driver to conveniently adjust the mirror. When making a righthand turn with a large van it is desirable that the righthand mirror be adjustable so that the driver may view the position of the wheels and rearward end portion of the trailer.

It is, therefore, the principal object of this invention to provide a novel mounting assembly for vehicle rear view mirrors in which adjustment of the visual angle of of sight can be readily and conveniently made by the driver at all times.

Another object is to provide a device of this class which includes a mirror equipped housing supported by a vertical shaft whereby the mirror and housing may be turned relative to the shaft to adjust the angle of sight.

Another object is to provide remote control means for rotating the mirror and housing.

A further object is to provide a mirror and housing assembly which replaces conventional rear view mirrors without any modification of the conventional mirror mounting bracket.

Still another object is to provide an adjustable mirror of this class wherein the mirror may be readily removed for replacement in the event of breakage without disassembly of the entire unit.

The present invention accomplishes these and other objects by shaft means extended vertically between the conventional mirror holding brackets and a mirror equipped housing surrounding the shaft means intermediate its ends. Pressure responsive means is connected to the shaft means within the housing for rotating the latter by remote control means.

Other objects will be apparent from the following description when taken in conjunction with the accompanying single sheet of drawings, wherein:

FIGURE 1 is a fragmentary perspective view of a truck cab having the mirror and housing assembly mounted thereon;

FIGURE 2 is a perspective view of the mirror and housing assembly connected with the supporting bracket;

FIGURE 3 is a horizontal cros-sectional view taken substantially along the line 3—3 of FIG. 2;

FIGURE 4 is an elevational view of the pressure responsive mirror control means, per se;

FIGURE 5 is an end elevational view of FIG. 4 taken substantially along the line 5—5 of FIG. 4; and, FIGURE 6 is a vertical cross-sectional view of an air pressure supply means.

Like characters of reference designate like parts in those figures of the drawings in which they occur.

In the drawings:

The reference numeral 10 indicates a fragment of a truck cab, or the like, having laterally projecting rear view mirror holding arms or brackets 12 connected thereto. The brackets 12 include a substantially U-shaped portion 14 having its legs 16 and 18 connected with the outwardly projecting ends of the brackets. An ear 20 is connected to the respective leg 16 and 18 and projects laterally therefrom in substantially vertical aligned relation. The free end portion of each ear 20 is longitudinally slotted. The ears 20 normally support a shaft connected with a conventional rear view mirror, not shown. The above description is conventional with respect to rear view mirrors and bracket assemblies presently used on large trucks, or the like, and is set forth to show the supporting means on which the improved rear view mirror is mounted.

In carrying out the invention I provide an elongated substantially rectangular housing 25 (FIGS. 2 and 3) formed of sheet metal, or the like, having a black wall 26 and side walls 28 and 30 terminating, respectively, in relatively narrow opposing front wall strips 32. The respective upper and lower end edges of the housing walls 26, 28, 30 and 32, are are interconnected by end plates 34 and 36 which overlap the side and rearward wall and portions and are secured thereto to screws 37. The length of the housing 25 is such that it may be freely received between the bracket ears 20 and transversely the width of the housing is such that it forms an open front 38 for removably receiving a rectangular mirror 40 substantially equal in width to a conventional truck rear view mirror as hereinafter described more fully.

Shaft means 41 extends through the housing. The shaft means comprises a rod 42 which extends through the end wall 36 and longitudinally of the housing terminating in spaced relation with respect to the upper end wall 34 where a T 44 is connected to the rod 42 which is in turn connected with a metallic tubular member 46, diametrically substantially equal to the rod 42, which projects outwardly through the end plate 34 in longitudinal alignment with the rod 42. Adjacent the plane formed by the front wall strips 32, a U-shaped channel 48 is secured to the respective inner surface of the side walls 28 and 30. The legs of the U-shaped channels project inwardly of the respective side wall in aligned relation thus forming a slot or groove for removably receiving a rectangular base plate 50. The spacing between the channels 48 and the inner surface of the front wall strips 32 forms opposing grooves for slidably receiving the marginal side edges of the mirror 40. The end plates 34 and 36 form stops normally preventing longitudinal movement of the mirror with respect to the housing.

A pair of brackets 52 are connected to the base plate 50 adjacent its respective ends. The brackets 52 each include an apertured ear portion 54 which loosely surrounds the rod 42 and tube 46, respectively. A rectangular pressure plate 56, substantially smaller than the base plate 50, is rigidly connected in parallel spaced relation along one longitudinal side edge to the rod 42 intermediate its ends, as by welding. The pressure plate 56 is normally disposed in spaced relation with respect to the base 50. A pneumatic tube or casing 58, having closed ends, is secured to the pressure plate 56 and longitudinally interposed between the base plate 50 and pressure plate 56. A flexible tube 60 connects one end of the pneumatic tube 58 to the T 44 through a fitting 62 equipped with a pop-off or pressure relief valve 64.

A pair of helical springs 66 surround the rod 42 adjacent the respective end portions of the pressure plate 56. Each of the springs have extended end portions contacting the adjacent surface of the base plate 50 and the surface of the pressure plate opposite the pneumatic tube, respectively.

The end portion of the rod 42, projecting beyond the end plate 36, is removably received by the slot in the depending ear 20 while the tube 46 is similarly received by the slot in the upper ear 20. Thus the mirror is positioned substantially vertical to the line of sight. The rod and tube are secured to the ears 20 against axial rotation by two pairs of stop nuts 68.

An elongated flexible tube 70 is connected to the free end of the tube 46 and is connected at its other end to an air supply means 72 located adjacent the driver's position within the cab 10. The air supply means 72 comprises a substantially conventional type tire pump 74 having a chamber 76 by which air is compressed in the depending portion thereof by a pump cup 78 operated by a T-shaped handle 80. A wall 81 is connected to the pump 74 to form a second chamber 82 parallel to the pump chamber 76. A fitting 84, positioned in the chamber 82, communicates with the depending end of the pump pressure chamber 76. Thus vertically reciprocating the handle 80 generates air pressure which is conveyed to the pneumatic tube 58 to expand the latter and rotate the base plate 50 and housing 25 about the vertical axis of the rod 42 and tube 46. A relief tube 86, provided at its upper end with a relief valve 88, is connected in depending relation to the handle 80 and extends downwardly into the chamber 82 where it is connected, at its depending end, by a helical tube 90 to the fitting 84. Thus, when the pneumatic tube 58 has been expanded the air may be released by opening the relief valve 88. Alternatively the elongated flexible tube 70 may be connected with a source of air under pressure, not shown, through a valve 92 and relief valve 94 so that, by opening the valve 92, the pneumatic tube 58 may be expanded and air subsequently released therefrom by the relief valve 94.

*Operation*

In operation the device is installed on the mirror bracket 14 as described hereinabove. The normal angle of sight permits the driver to view the rearward end portion of the truck and the road way therebehind.

When the driver, so that he may observe the right rearward portion of the truck, as for example, when making a righthand turn, desires to change the angle of sight of the mirror 40, he applies air pressure to the pneumatic tube 58 by the pump 74 or through the valve 92 until the expanding pneumatic tube 58 has rotated the base plate 50, housing 25 and mirror 40 to the desired angle. If through inadvertency the mirror has been rotated beyond the desired angle of sight a portion of the air pressure is released through the valve 88 or 94 wherein the springs 66 pivot the housing and mirror back toward its normal position.

When it becomes necessary to replace the mirror 40 the end plate 34 is released from the housing back wall and side walls, by removing the screws 37, and moved laterally of the plane of the front wall strips 32 by means of an elongated slot 96 formed in the end plate 34 and surrounding the tube 46 to expose the upper end edge of the mirror 40. The mirror 40 may then be manually lifted out of the housing and replaced by a new mirror.

Obviously the invention is susceptible to some change or alteration without defeating its practicability, and I therefore, do not wish to be confined to the preferred embodiment shown in the drawings and described herein, further than I am limited by the scope of the appended claims.

I claim:

1. A rear view mirror assembly for vehicles having a mirror supporting bracket at one side thereof, comprising: a housing; shaft means extending through said housing and rigidly connected, on a substantially vertical axis, with said mirror supporting bracket; a mirror mounted in said housing in a plane substantially vertical to the line of sight; pressure responsive means within said housing and connected with said shaft means for rotating said housing about the vertical axis of said shaft means; control means actuating said pressure responsive means; said shaft means comprising: a rod; a metallic tube; a T coaxially connecting said rod and said metallic tube; and a relief valve fitting interposed between said T and said pressure responsive means.

2. Structure as specified in claim 1 in which said pressure responsive means comprises: a base plate mounted in said housing and pivotally connected with said shaft means for rotation about the vertical axis of the latter; a pressure plate rigidly secured to said rod; and a pneumatic tube interposed between said base plate and said pressure plate.

3. Structure as specified in claim 2 and spring means mounted on said rod and bearing against said base plate, and said pressure plate normally pivoting said base plate toward said pressure plate.

4. Structure as specified in claim 3 in which the control means comprises: an air pump having a discharge end; a flexible tube interconnecting the discharge end of said air pump with said metallic tube; and a relief valve equipped tube connected with the discharge end of said pump for releasing air pressure within said flexible tube.

References Cited

UNITED STATES PATENTS

| 3,005,384 | 10/1961 | Baird et al. | 350—289 |
| 3,013,392 | 12/1961 | Falge et al. | 350—289 X |

FOREIGN PATENTS

| 1,046,516 | 12/1958 | Germany. | |

DAVID SCHONBERG, *Primary Examiner.*

J. W. LEONARD, *Assistant Examiner.*

U.S. Cl. X.R.

248—479